United States Patent [19]
Wilkins

[11] Patent Number: 4,765,083
[45] Date of Patent: Aug. 23, 1988

[54] FISHING LINE HOLDER AND FISHING ROD TIP GUARD

[76] Inventor: James F. Wilkins, 320 Bentley Dr., Brandon, Miss. 39042

[21] Appl. No.: 125,156

[22] Filed: Nov. 25, 1987

[51] Int. Cl.⁴ .............................................. A01K 97/08
[52] U.S. Cl. ...................................................... 43/26
[58] Field of Search ..................... 43/26, 25, 25.2; 206/315.11; 224/920

[56] References Cited

U.S. PATENT DOCUMENTS

| | | | |
|---|---|---|---|
| D. 217,663 | 5/1970 | Chamberlain | 43/25.2 |
| 2,561,289 | 7/1951 | Paris | 43/25 |
| 2,781,602 | 2/1957 | Warford | 43/25.2 |
| 3,199,243 | 8/1965 | Caston | 43/26 |
| 3,416,256 | 12/1968 | Blocker | 43/25.2 |
| 3,521,393 | 7/1970 | Gordon | 43/25.2 |
| 3,581,428 | 6/1971 | Helder | 43/25 |
| 4,216,604 | 8/1980 | Starke | 43/26 |
| 4,261,129 | 4/1981 | Ohmura | 43/26 |

*Primary Examiner*—Kurt Rowan
*Attorney, Agent, or Firm*—Dewitt L. Fortenberry, Jr.

[57] ABSTRACT

A fishing line holder which cuts a fishing line removing a fishing lure and engages the fishing line leading to the rod and reel. The fishing line holder also forms a cavity so that when the fishing line is reeled in, the tip of the fishing rod is accepted into the fishing line holder so that the tip of the rod is protected. In this position, the fishing line is also held tight so that it will not become entangled during storage.

7 Claims, 2 Drawing Sheets

FISHING LINE HOLDER AND FISHING ROD TIP GUARD

SUMMARY OF THE INVENTION

This invention relates to an attachment for a fishing rod. More particularly, the invention is used to remove a fishing lure from a fishing line, protect the tip of the fishing rod, and maintain the fishing line in a tight manner to prevent it from becoming entangled while the fishing rod is being transported or stored.

Fishing rod tip guards are known in the prior art as indicated by U.S. Pat. No. 4,216,604 (Starke). There are also hook guards attachable to fishing rods as indicated by U.S. Pat. No. 3,199,243 (Caston), U.S. Pat. No. 4,418,490 (Ancona), U.S. Pat. No. 3,086,312 (Davis), U.S. Pat. No. 3,800,456 (Rowe), and U.S. Pat. No. 2,767,502 (Reynolds). Those devices do not, however, accomplish the several objectives of severing the fishing lure from the fishing line, engaging the fishing line in a tight manner, and protecting the tip of the fishing rod.

Typically, when a person has finished fishing, the fishing lure is reeled in and left attached to the fishing line. In this position. the lure and the tip of the fishing rod are unprotected and therefore, often damaged. If the tip of the fishing rod is damaged, the entire rod is rendered relatively useless. Also, if the fisherman removes the fishing lure to store it in a tackle box, the fishing line usually remains loose and often becomes entangled while the fishing rod is stored.

Briefly, the present invention is designed so that a fishing line may be inserted within its body and the line cut thereby severing the fishing lure from the line. However, the invention is releasably secured to the fishing line leading to the reel. The invention also has a cavity for accepting the tip of the fishing rod so that when the fishing line is reeled in, the invention fits over the tip of the rod so that it will protect that portion of the rod. Additionally, in this position, the invention holds the fishing line leading to the reel tight so that it will not become entangled with other objects or accidentally reeled into the reel.

It is, therefore, an object of this invention to sever a fishing lure or hook from a fishing line.

Another object of this invention is to guard and protect the tip of a fishing rod.

Yet another object of this invention is to maintain a fishing line in a tight position so that it will not become entangled with other objects or accidentally reeled into a fishing reel.

It is also an object of this invention to provide a device which is simple and easy to use.

These and other objects of this invention will become readily apparent upon examination of the attached drawings and detailed description of the preferred embodiment.

DESCRIPTION OF THE PREFERRED EMBODIMENT

Figure 1:
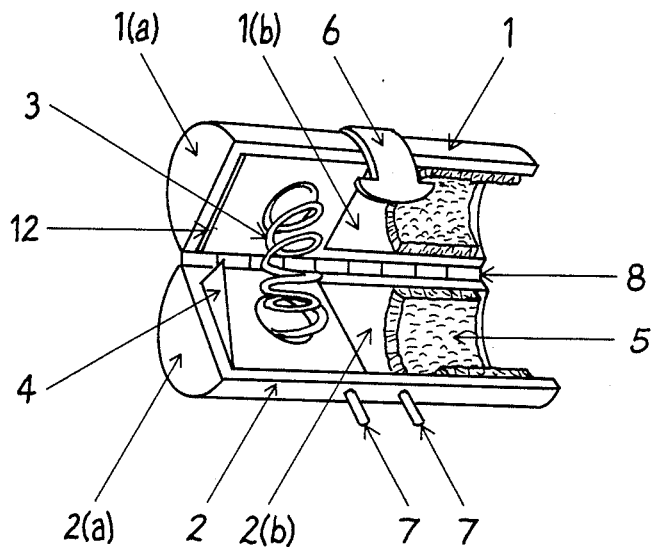
FIG. 1 is a view of the invention in its open position.

Referring to FIG. 1, the invention consists of a plurality of sleeve members identified as a first sleeve 1 and a second sleeve 2. The first sleeve 1 and the second sleeve 2 are pivotally connected along adjacent edges of said first sleeve 1 and said second sleeve 2 as indicated by a hinge 8.

It should also be noted that the first sleeve 1 and the second sleeve 2 have adjacent closed ends 1(a) and 2(a) respectively with the opposite ends of said first sleeve 1 and said second sleeve 2 being open. Adjacent to the open end of said first sleeve 1 and said second sleeve 2, the innermost wall 1(b) of said first sleeve 1 and the innermost wall 2(b) of said second sleeve 2 are cylindrically shaped so as to form a cavity for accepting the tip of a fishing rod 10, when the invention is in its closed position. Attached to the innermost wall 1(b) and the innermost wall 2(b) is a foam-like padding 5 for protecting the tip of the fishing rod 10 when it is inserted into the invention.

The invention also includes a spring 3 as a means for releasibly securing the invention to a fishing line. One end of said spring 3 is secured to the first sleeve 1 and the opposite end of said spring 3 is secured to the second sleeve 2 so that when the invention is in an open position as shown in FIG. 1, a fishing line may be inserted between the coils of the spring 3. Thus, when the invention is in a closed position, the coils of spring 3 will squeeze the fishing line thereby securing the invention to the fishing line.

Attached to the inner portion of the second sleeve 2 is a cutting means represented by a cutting blade 4. Within said first sleeve 1, opposite said cutting blade 4 is a slot 12 for accepting said cutting blade 4 when the invention is in a closed position as indicated in FIG. 2.

Figure 2:
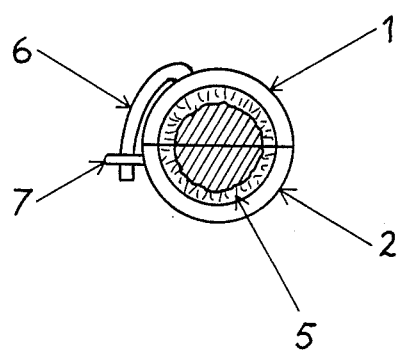
FIG. 2 is a view of the open end of the invention in its closed position.
Figure 3:
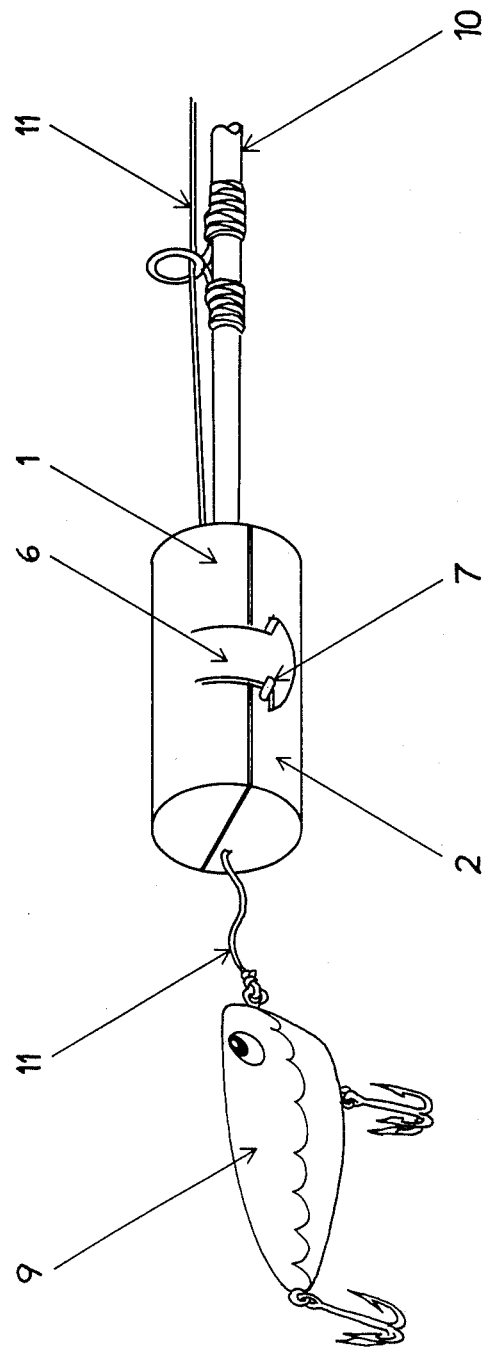
FIG. 3 is a view of the invention in relation to a fishing lure, fishing line, and fishing rod.

As can be seen in both FIG. 1 and FIG. 2, a means for maintaining the first sleeve 1 and the second sleeve 2 in a closed position is represented by a snap latch mechanism consisting of snap 6 and a plurality of latch members 7. Said latch members 7 are positioned to releasibly engage said snap 6 so that the first sleeve 1 and the second sleeve 2 can be maintained in a closed position as indicated in FIG. 2. When the invention is in its closed position, and someone desires to open it, all that is necessary is to pull the snap 6 in a direction away from the second sleeve 2. That pulling action will release the snap 6 from said latch members 7 thereby allowing the invention to be opened in the position shown in FIG. 1.

When a fisherman is finished fishing, the invention is positioned between the fishing lure 9 and the fishing rod 10 with its open end facing said fishing rod 10 so that the fishing line 11 runs through the spring 3 and across the blade 4. The first sleeve 1 and the second sleeve 2 are then closed and the snap 6 engaged with latch members 7. The blade 4 therefore cuts the fishing line 11 so that the lure 9 can be stored in a tackle box. The spring 3 will squeeze the fishing line 11 so that the invention is secured to said fishing line 11 and the fisherman can reel in the fishing line 11 and the cavity formed by the cylindrical shaped innerwalls 1(b) and 2(b) will accept the tip of the fishing rod 10. In this position, the invention protects the tip of the fishing rod 10 and will also maintain the fishing line 11 in a tight manner.

Although particular components have been discussed with respect to the specific embodiment of the invention, other components may be utilized in accordance with the teaching of the present invention. Furthermore, it is understood that although an exemplary embodiment of the invention has been disclosed, other applications and mechanical arrangements are possible and the embodiment disclosed may be subjected to various changes, modifications, and substitutes without departing from the spirit of the invention.

What is claimed is:

1. A device attachable to a fishing rod comprising:
    a plurality of sleeve members having similar peripheral edges, said plurality of sleeve members being connected by a hinge along a pair of adjacent edges so that when said sleeve members are in a closed position a cavity for accepting the tip of a fishing rod is formed;
    a cutting means attached to said sleeve members;
    a means for maintaining said plurality of sleeve members in a closed position; and
    a means for securing to a fishing line when said sleeve members are in a closed position.

2. The device of claim 1 wherein said cutting means comprises a cutting blade secured to one of said sleeve members and the other sleeve member having a slot for accepting said cutting blade when said plurality of sleeve members are in a closed position.

3. The device of claim 1 wherein said means for securing to a fishing line is a spring interconnected between said plurality sleeve members.

4. The device of claim 1 wherein said means for maintaining said plurality of sleeve members in a closed position is a snap latch mechanism.

5. The device of claim 1 wherein said cavity for accepting the tip of a fishing rod includes a foam-like coating.

6. A device attachable to a fishing rod comprising:
    a plurality of sleeve members having similar peripheral edges, said plurality of sleeve members being connected by a hinge along a pair of adjacent edges so that when said sleeve members are in a closed position, a cavity for accepting the tip of a fishing rod is formed;
    a cutting blade secured to one of said sleeve members and the other sleeve member having a slot for accepting said cutting blade when said plurality of sleeve members are in a closed position;
    a spring interconnected between said plurality of sleeve members for releasibly securing a fishing line; and
    a snap latch for releasibly maintaining said plurality of sleeve members in a closed position.

7. The device of claim 6 wherein said cavity for accepting the tip of a fishing rod includes a foam-like coating.

* * * * *